United States Patent [19]

Kvivik

[11] Patent Number: 4,722,684
[45] Date of Patent: Feb. 2, 1988

[54] ARRANGEMENT FOR SUSPENSION OF A BAKING FURNACE FOR ELECTRODES

[75] Inventor: Henrik M. Kvivik, Kristiansand, Norway

[73] Assignee: Elkem a/s, Oslo, Norway

[21] Appl. No.: 885,234

[22] Filed: Jul. 14, 1986

[30] Foreign Application Priority Data

Aug. 22, 1985 [NO] Norway ................................. 853319

[51] Int. Cl.⁴ ................................................. F21J 3/00
[52] U.S. Cl. ..................... 432/225; 264/105; 373/89; 432/229
[58] Field of Search ............... 432/225, 229, 241, 123; 373/89; 264/104, 105; 228/25

[56] References Cited

U.S. PATENT DOCUMENTS

| | | | |
|---|---|---|---|
| 1,751,177 | 3/1930 | Sem et al. | 373/89 |
| 2,193,434 | 3/1940 | Sem | 373/89 X |
| 3,131,917 | 5/1964 | Gessner et al. | 432/229 X |
| 3,524,004 | 8/1970 | Van Nostran et al. | 373/89 |
| 4,612,151 | 9/1986 | Bruff et al. | 373/89 X |

Primary Examiner—Edward G. Favors
Attorney, Agent, or Firm—Lucas & Just

[57] ABSTRACT

The present invention relates to an arrangement for suspension of a baking furnace (19) for continuous production of carbon electrodes in direct connection with the smelting furnace (2) wherein the electrodes are consumed. The baking furnace is suspended from a baking furnace frame (15) by means of at least three rails (16), said rails (16) being connected to the baking furnace frame (15) at their upper ends by means of first universal joints (17) and the baking furnace (19) being connected to the rails (16) by means of second universal joints (25) and wherein the baking furnace at its upper ends are equipped with means (21) for guiding the electrode into the baking furnace (19). The rails (16) are preferably threaded spindles and the baking furnace being connected to the spindles by means of nuts (20) having spherical bearings (25). At the lower end of the baking furnace there are preferably arranged at least three guide wheels (23) which via brackets (24) are affixed to the baking furnace (1).

8 Claims, 4 Drawing Figures

ARRANGEMENT FOR SUSPENSION OF A BAKING FURNACE FOR ELECTRODES

BACKGROUND OF THE INVENTION

The present invention relates to an arrangement for suspension of an electrode baking furnace about a carbon electrode which is produced in direct connection with the furnace wherein the electrode is consumed.

It is known to produce continuous carbon electrodes in direct connection with the furnace wherein they are consumed by supplying heat energy to unbaked electrode paste comprising a particulate carbon material and a carbonaceous binder.

The baking furnace is arranged above the level where electric operating current is conducted to the electrode. Green electrode paste is charged into a steel casing which is removed when the electrode has passed through the baking furnace. In this way the product which is produced in the smelting furnace is not contaminated by the iron of the steel casing. As the electrode is consumed new sections of steel casing are put on the top of the electrode and additional green electrode paste is charged into the casing.

In order to produce a homogeneous electrode it is important that the bakihg furnace moves continuously or substantially continuously relative to the electrode with a velocity which corresponds to a preset baking speed for the electrode.

During the baking, the electrode paste becomes more or less liquid, whereafter it is burned to a solid carbon electrode. As the baking temperature is between 700° and 1300° C., the steel casing will become very soft in the baking zone inside the baking furnace. The electrode including the casing thereiore has an extremely low strength when it is inside the baking furnace. In order to produce a continuous electrode, the electrode therefore has to be guided through the baking furnace.

As the electrode has to pass through another two fixed points, namely the current clamps for conducting electric operating current to the electrode and the electrode holding and slipping equipment, any deviation from straight-lined electrode will result in clamping or sticking of the electrode. The electrode will thus either break at a point between the three fixed points which it runs through or it will be impossible to slip the electrode through the electrode holder.

It is further important that the electrode during the baking process is kept centrally in the baking furnace in order to obtain equal heating conditions about the periphery of the electrode.

It is therefore an object of the present invention to provide a suspension device for the baking furnace which makes it unnecessary to guide the electrode through three fixed points, but which at the same time keeps the electrode centrally in the baking furnace. By use of the present invention it has further been shown that any deviation from a straight-lined electrode is automatically compensated.

SUMMARY OF THE INVENTION

Accordingly the present invention relates to an arrangement for suspension of a baking furnace for continuous production of carbon electrodes in direct connection with the smelting furnace wherein the electrodes are consumed. The baking furnace is suspending from a baking furnace frame by means of at least three rails, said rails being connected to the baking furnace frame by means of first spherical connections and to the baking furnace by means of second spherical connections. The electrode is kept centrally in the baking furnace by guiding means, at least in the upper part of the baking furnace.

Preferably, the rails are threaded spindles or hydraulic cylinders, whereby the baking furnace can be moved continuously or substantially continuously relative to the electrode at a speed equal to the preferred baking speed of the electrode.

According to a preferred embodiment of the present invention three guide wheels for the electrode are arranged at the lower end of the baking furnace for guiding the electrode through the lower end of the baking furnace.

When spindles are used as rails, the spindles are connected to the baking furnace by means of nuts where the nuts via spherical bearings are affixed to the baking furnace. In order to move the baking furnace up or down the spindles are interconnected by axels to a common drive unit, so that the three spindles are rotated at the same time and at the same speed.

When hydraulic cylinders are used as rails, the movement of the pistons of the cylinders is interconnected in order to move the three pistons at the same time and at the same speed.

Further embodiments of the present invention will be evident from the claims.

The arrangement according to the present invention will now be further described in connection with the drawings which shows preierred embodiments of the present invention.

DETAILED DESCRIPTION

Figure 1:
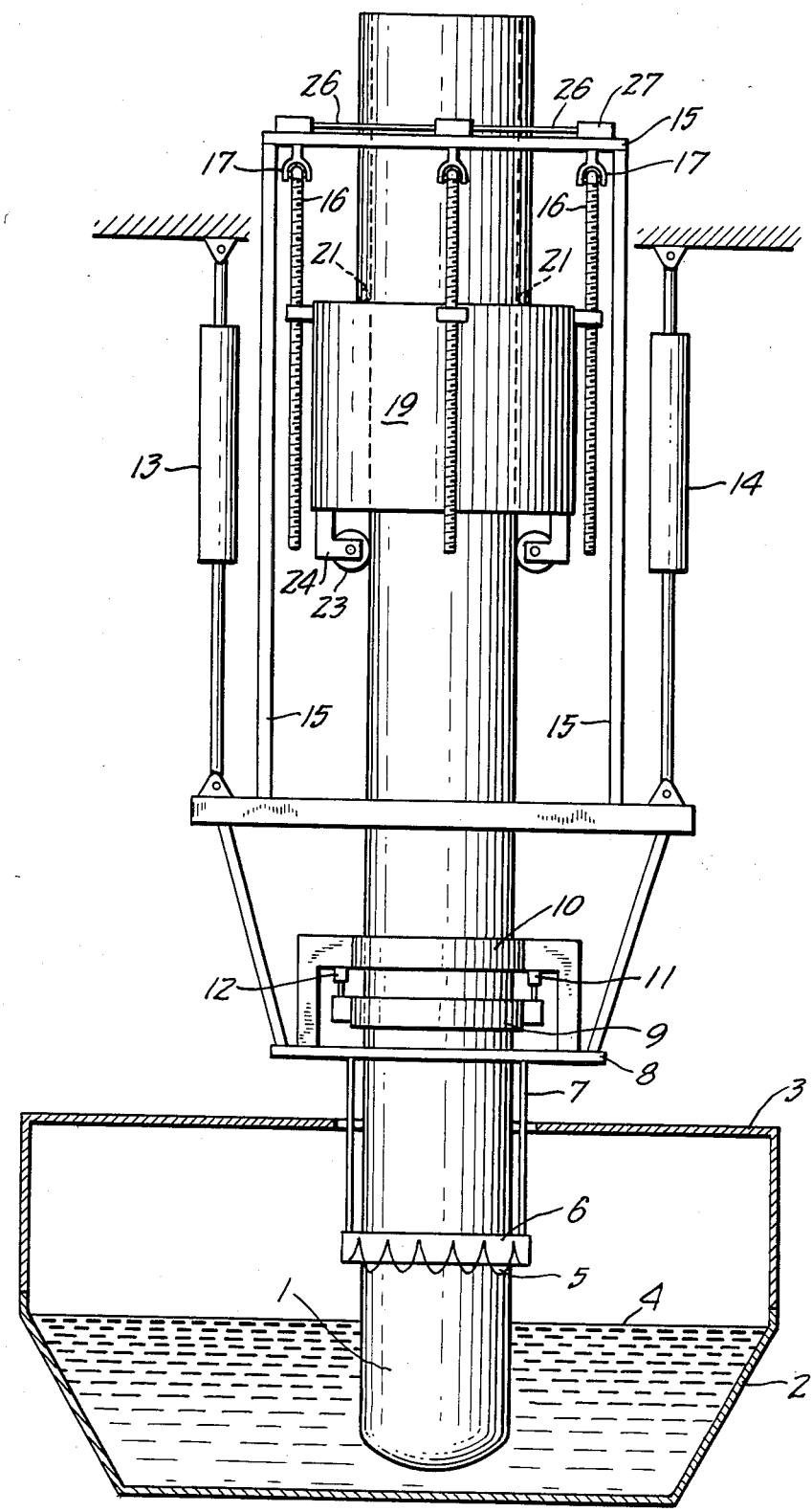
FIG. 1 is a schematic view of an electrode in an electric furnace showing the arrangement for suspendion of the baking furnace according to the present invention.

On FIG. 1 there is shown an electrode 1 in an electric smelting furnace 2. The smelting furnace has a smoke hood or roof 3 and the level of charge in the furnace is indicated by reference numeral 4.

Conventional current clamps for conduction of electric operating current to the furnace are schematically shown by reference numeral 5. The current clamps 5 are pressed against the surface of the electrode by means of a pressure ring 6. The current clamps 5 and the pressure ring 6 have internal channels for circulation of a cooling fluid (not shown). The current clamps 5 are via rods 7 suspended from an electrode frame 8.

On the electrode frame 8, there is arranged two conventional holding and slipping rings 9, 10 for the electrode 1. The lower holding and slipping ring can be moved vertically by means of hydraulic or pneumatic cylinders 11 and 12.

The electrode frame 8 is in conventional way suspended in the furnace building by means of hydraulic electrode regulating cylinders 13 and 14. On the electrode frame 8, there is arranged a baking furnace frame 15. From the top of the baking furnace frame 15 three rails 16 are suspended. The rails 16 are spherically suspended from the frame 15 by means of universal joints such as ball bearings or cardan joints 17.

Figure 2:
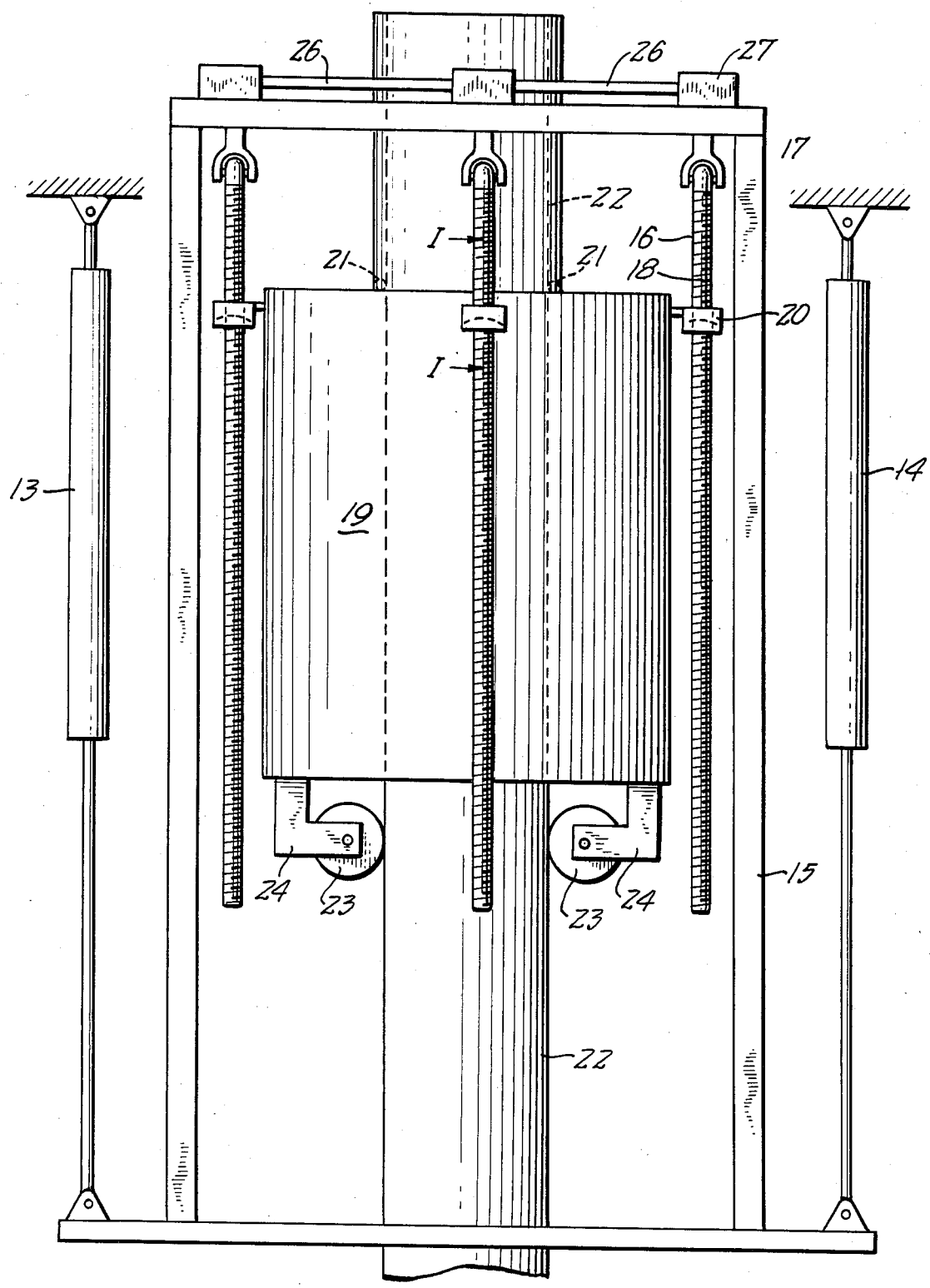
FIG. 2 is an enlarged view of the upper part of FIG. 1, showing the baking furnace and the arrangement for suspension of the baking furnace.

In the embodiment shown on FIG. 2, the rails 16 are in the form of spindles with threads 18. A baking furnace 19 for baking of the electrode is connected to the spindles 16 by means of nuts 20.

Figure 3:
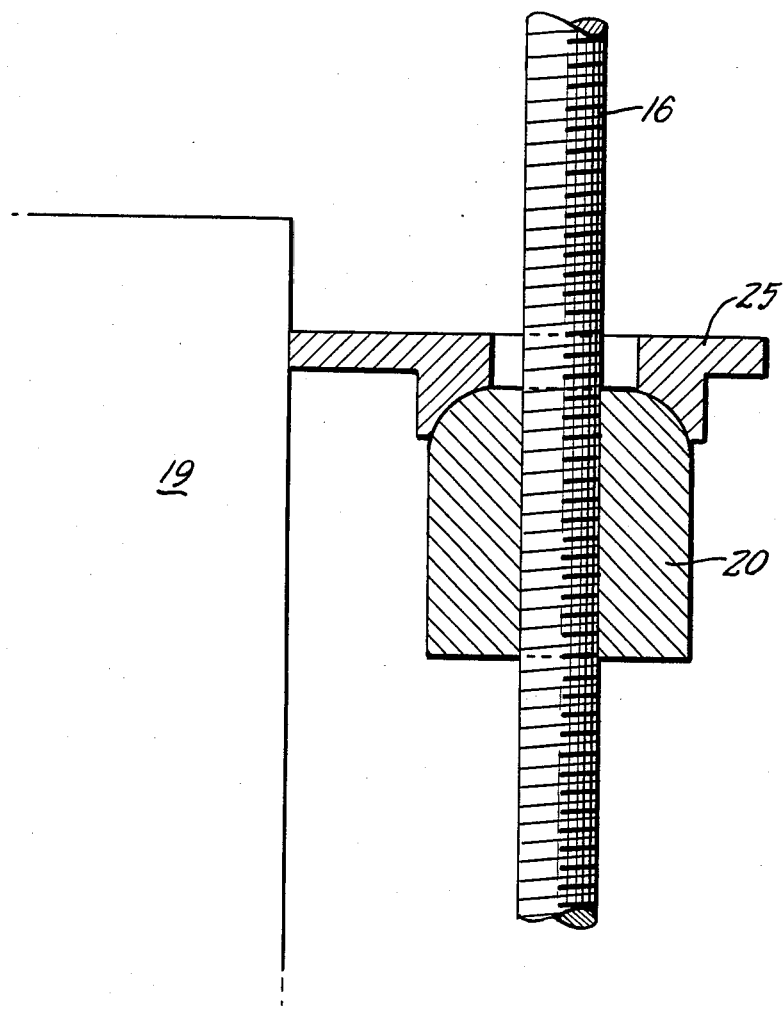
FIG. 3 is vertical view taken along line 1—1 in FIG. 2.

As shown on FIG. 3, the nuts 20 are connected to the baking furnace by spherical bearings 25. In order to move the baking furnace 19 up or down relative to the electrode, the spindles 16 are interconnected by axels 26 to a common drive unit 27 whereby the spindles 16 can be rotated at the same time and at the same speed.

The baking furnace 19 is in its upper end equipped with a guide ring 21 made from iron rod or the like. The inner diameter of the ring 21 is equal to or somewhat larger than the diameter of the electrode casing 22. The guide ring 21 is intended to guide the electrode through the baking furnace 19.

Below the baking furnace 19 there are preierably arranged guide wheels 23 which via brackets 24 are affixed to the baking furnace 19. The guide wheels 23 are intended to guide the baked electrode.

Figure 4:
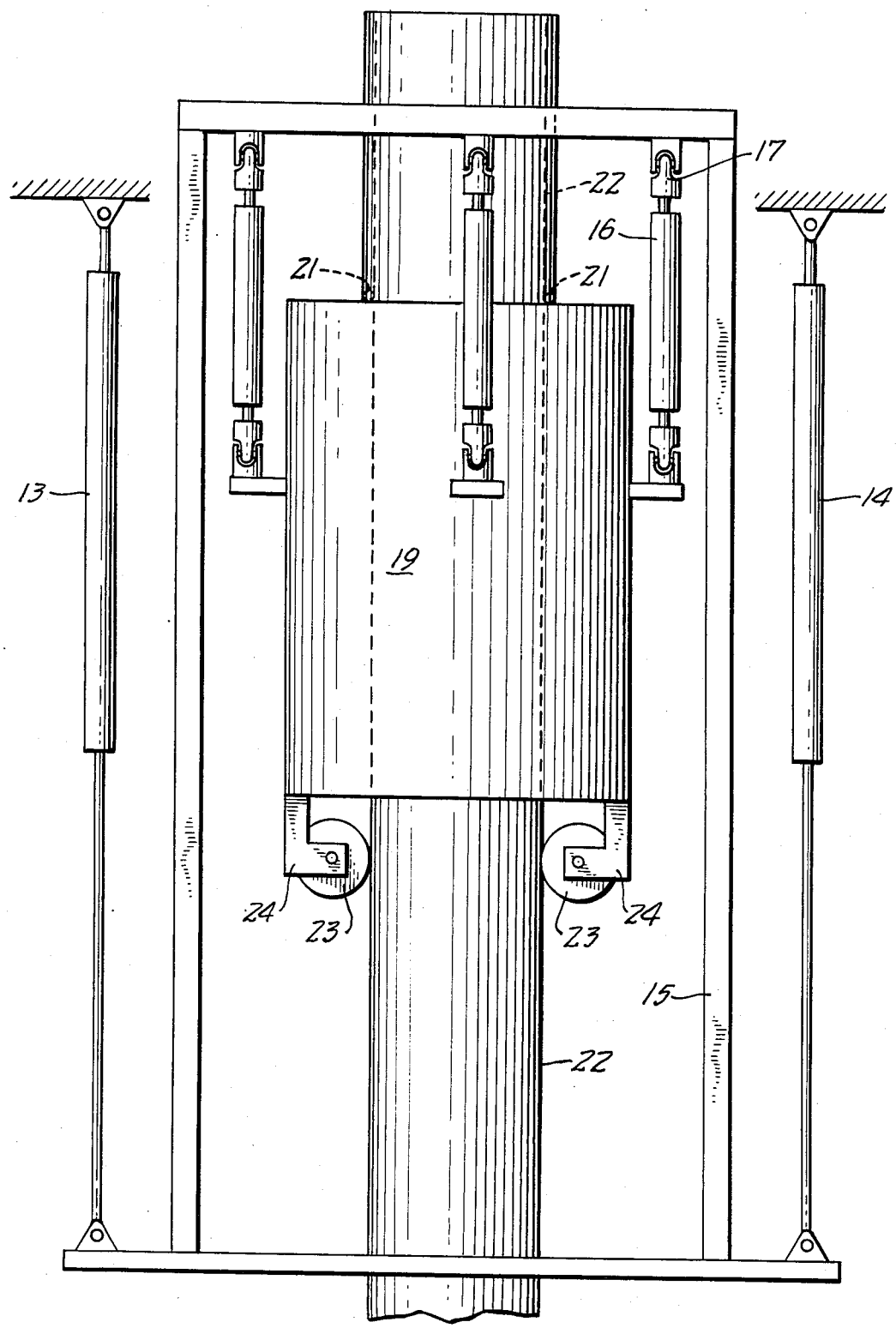
FIG. 4 is schematic view similar to FIG. 2 showing another embodiment of the present invention.

On FIG. 4 there is shown another embodiment of the present invention where the rails 16 are in the form of hydraulic cylinders 16. The lower end of the cylinders 16 are connected to the baking furnace by means of universal joints such as ball connection or cardan joints. In order to obtain a continuous or substantially continuous movement of the baking furnace the supply of hydraulic fluid to the cylinders 16 are interconnected.

The baking furnace 19 is equipped with means for supply of heat energy, such as oil or gas burners or electric heating elements (not shown). As the electrode is consumed in the smelting furnace, it is slipped down through the current clamps by operating the holding- and slipping ring 9, 10. The movement of the baking furnace 19 is preferably interconnected with the electrode slipping equipment in such a way that when the electrode is slipped a certain increment through the holding and slipping rings 9, 10 the baking furnace 15 will automatically be moved an equal distance downwards. In this way the position of the baking furnace is kept in the same position relative to the baking zone in the electrode.

As the baking furnace according to the present invention is suspended in rails which are connected to the baking furnace frame and to the baking furnace by universal joints and the electrode is guided at least in the upper part of the baking furnace, a deviation from a straight-lined electrode will imply that the baking furnace is automatically moved radially outwards from the center line of the electrode while the electrode still will be centrally situated in the baking furnace. It is thereby avoided that deviations irom a straight-lined electrode will clamp the electrode. It has further surprisingly been found that if a deviation from a straight-lined electrode occurs, and the baking furnace thereby moves out from the center line for a straight-lined electrode, the electrode will soon move back to the center line for a straight-lined electrode. This means that the arrangement for suspending the baking furnace according to the present invention is self-centering.

What is claimed:

1. Arrangement for suspending a baking furnace for continuously production of carbon electrodes in direct connection with the smelting furnace wherein the electrodes are consumed, characterized in that the baking furnace (19) is suspended from a baking furnace frame (15) by means of at least three rails (16) said rails (16) being connected to the baking furnace frame (15) at their upper ends by means of first spherical joints (17) and where the baking furnace (19) is connected to the rails by means of second spherical joints (25), the baking furnace having means (21) at its upper end for guiding the electrode.

2. Arrangement according to claim 1, characterized in that the rails (16) are threaded spindles.

3. Arrangement according to claim 2, characterized in that the baking furnace (19) is connected to the spindles by means of nuts (20).

4. Arrangement according to claim 3, characterized in that the nuts (20) is affixed to the baking furnace by means of spherical bearings (25).

5. Arrangement according to claim 2, characterized in that the spindles (16) via axels (26) are connected to a common drive unit (27) for rotation of the spindles (16).

6. Arrangement according to claim 1, characterized in that the rails (16) are hydraulic cylinders.

7. Arrangement for suspending a baking furnace for continuous production of carbon electrodes in direct connection with a smelting furnace wherein the electrodes are consumed characterized in that the baking furnace is suspended from a baking furnace frome by means of at least three rails, said rails being connected to the baking furnace frame. at their upper ends by means of first spherical joints and where the baking furnace is connected to the rail by means of second spherical joints the baking furnace having a guide ring for guiding the electrode in the upper part of the baking furnace, the guide ring having a diameter equal to or somewhat larger than the diameter of the electrodes.

8. Arrangement for suspending a baking furnace for continuous production of carbon electrodes in direct connection with a smelting furnace wherein the electrodes are consumed characterized in that the baking furnace is suspended from a baking furnace frame by means of at least three rails being connected to the baking furnace frame at their upper ends by means of first spherical joints and where the baking furnace is connected to the rail by means of second spherical joints the baking furnace having means at its upper end for guiding the electrode, and at the lower part of the baking furnace there are arranged at least three guide wheels for guiding the electrodes.

* * * * *

UNITED STATES PATENT AND TRADEMARK OFFICE
CERTIFICATE OF CORRECTION

PATENT NO. : 4,722,684
DATED : February 2, 1988
INVENTOR(S) : Henrik M. Kvivik

It is certified that error appears in the above-identified patent and that said Letters Patent are hereby corrected as shown below:

Column 4, line 36, change "frome" to --frame--.

Column 4, line 50, after "rails" insert --, said rails--.

Signed and Sealed this

Nineteenth Day of July, 1988

Attest:

DONALD J. QUIGG

*Attesting Officer*     *Commissioner of Patents and Trademarks*